US011443307B2

(12) United States Patent
Sun et al.

(10) Patent No.: US 11,443,307 B2
(45) Date of Patent: Sep. 13, 2022

(54) CROSS-BORDER RESOURCE TRANSFER AUTHENTICITY VERIFICATION METHOD, DEVICE AND ELECTRONIC EQUIPMENT

(71) Applicant: ALIPAY (HANGZHOU) INFORMATION TECHNOLOGY CO., LTD., Zhejiang (CN)

(72) Inventors: Lingao Sun, Hangzhou (CN); Ying Peng, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/358,046

(22) Filed: Jun. 25, 2021

(65) Prior Publication Data

US 2022/0036350 A1 Feb. 3, 2022

(30) Foreign Application Priority Data

Jul. 31, 2020 (CN) .......................... 202010757543.3

(51) Int. Cl.
*G06Q 40/00* (2012.01)
*G06Q 20/38* (2012.01)
(Continued)

(52) U.S. Cl.
CPC ..... *G06Q 20/38215* (2013.01); *G06Q 20/102* (2013.01); *G06Q 20/3825* (2013.01); *G06Q 20/4014* (2013.01)

(58) Field of Classification Search
CPC ......... G06Q 320/38215; G06Q 20/102; G06Q 20/3825; G06Q 20/4014
See application file for complete search history.

(56) References Cited

U.S. PATENT DOCUMENTS 10,581,805 B2   3/2020  Simons et al.
11,080,689 B1*  8/2021  Remeika, Jr. ........... H04L 63/10
(Continued)

FOREIGN PATENT DOCUMENTS

CA      3055829 A1    9/2018
CN    107004195 A    8/2017
(Continued)

OTHER PUBLICATIONS

Anonymous, "How to Use Blockchain to Prevent Money Laundering," https://www.devteam.space/blog, DevTeamSpace Engineering Blog, May 10, 2018. (Year: 2018).*
(Continued)

*Primary Examiner* — Alexander G Kalinowski
*Assistant Examiner* — William B. Bunker

(57) ABSTRACT

This specification provides method for auditing authenticity of cross-border resource transfers, device, and electronic equipment. The method is implemented on a client device, and comprises: obtaining cross-border resource transfer information initiated by an initiator of a cross-border resource transfer; obtaining, in response to the cross-border resource transfer information, identification information corresponding to proof information that is stored in a blockchain and corresponds to the cross-border resource transfer information; generating a cross-border resource transfer request based on the cross-border resource transfer information and the identification information; and sending, to an auditor of cross-border resource transfers, the cross-border resource transfer request, causing the auditor to perform, based on the proof information that is stored in the blockchain and corresponds to the identification information, an authenticity verification on the cross-border resource transfer information.

18 Claims, 4 Drawing Sheets

(51) Int. Cl.
    *G06Q 20/10*     (2012.01)
    *G06Q 20/40*     (2012.01)

(56) References Cited

U.S. PATENT DOCUMENTS

| | | | |
|---|---|---|---|
| 2015/0058931 A1* | 2/2015 | Miu | G06Q 20/02 |
| | | | 726/3 |
| 2017/0005804 A1 | 1/2017 | Zinder | |
| 2017/0243212 A1 | 8/2017 | Castinado et al. | |
| 2018/0253464 A1 | 9/2018 | Kohli et al. | |
| 2018/0268479 A1* | 9/2018 | Dowling | G06Q 50/18 |
| 2019/0197622 A1* | 6/2019 | Molinari | H04L 9/3297 |
| 2019/0347652 A1* | 11/2019 | Johnson | G06Q 20/102 |
| 2020/0005308 A1 | 1/2020 | Snyder et al. | |
| 2020/0051067 A1* | 2/2020 | Overholser | G06F 16/1834 |
| 2020/0118068 A1* | 4/2020 | Turetsky | G06Q 20/06 |
| 2020/0133955 A1* | 4/2020 | Padmanabhan | H04L 63/123 |
| 2020/0134656 A1* | 4/2020 | Padmanabhan | H04L 63/123 |
| 2020/0151686 A1* | 5/2020 | Komandur | G06F 16/2315 |
| 2020/0151791 A1 | 5/2020 | Degaugue et al. | |
| 2020/0186355 A1 | 6/2020 | Davies | |
| 2020/0210594 A1* | 7/2020 | Talmor | G06F 21/602 |
| 2020/0213291 A1* | 7/2020 | Cage | H04L 9/14 |
| 2020/0272619 A1 | 8/2020 | Alferov | |
| 2020/0294048 A1 | 9/2020 | Ye et al. | |
| 2020/0294124 A1* | 9/2020 | Jia | G06Q 40/02 |
| 2020/0334379 A1* | 10/2020 | DeRosa-Grund | H04L 9/3255 |
| 2021/0201311 A1 | 7/2021 | Guo et al. | |
| 2022/0108312 A1* | 4/2022 | Makrides | G06Q 20/10 |

FOREIGN PATENT DOCUMENTS

| | | | | |
|---|---|---|---|---|
| CN | 107360238 A | | 11/2017 | |
| CN | 107392584 A | | 11/2017 | |
| CN | 107924389 A | | 4/2018 | |
| CN | 109067541 A | | 12/2018 | |
| CN | 109165993 A | | 1/2019 | |
| CN | 109313762 A | | 2/2019 | |
| CN | 109325331 A | | 2/2019 | |
| CN | 109598142 A | | 4/2019 | |
| CN | 109615516 A | | 4/2019 | |
| CN | 109741045 A | | 5/2019 | |
| CN | 109767217 A | | 5/2019 | |
| CN | 109784880 A | | 5/2019 | |
| CN | 110060156 A | | 7/2019 | |
| CN | 110570282 A | | 12/2019 | |
| CN | 110609869 A | | 12/2019 | |
| CN | 110910109 A | | 3/2020 | |
| CN | 111008825 | * | 4/2020 | G06Q 20/06 |
| CN | 111164629 | * | 5/2020 | G06Q 20/36 |
| CN | 111311356 A | | 6/2020 | |
| CN | 111383014 A | | 7/2020 | |
| TW | I688914 B | | 3/2020 | |
| WO | WO-2019217936 A1 | * | 11/2019 | G07F 9/026 |
| WO | 2019246627 A1 | | 12/2019 | |
| WO | WO-2020257597 A1 | * | 12/2020 | G06Q 20/023 |

OTHER PUBLICATIONS

Tracy Kitten, "Money Laundering: New Cross-Border Concerns," htts://www.bankinfosecurity.com, 2011 (Year: 2011).*

First Search for Chinese Application No. 202010757543.3 dated Oct. 10, 2020.

First Search for Chinese Application No. 202110050449.9 dated Mar. 23, 2022.

* cited by examiner

CROSS-BORDER RESOURCE TRANSFER AUTHENTICITY VERIFICATION METHOD, DEVICE AND ELECTRONIC EQUIPMENT

CROSS-REFERENCE TO RELATED APPLICATIONS

This application is based upon and claims priority to and benefits of Chinese Patent Application No. 202010757543.3, filed on Jul. 31, 2020. The content of the above identified applications is incorporated herein by reference in its entirety.

TECHNICAL FIELD

This specification relates to the field of computer network technology, and in particular, to a method, device, and electronic equipment for auditing authenticity of cross-border resource transfers.

BACKGROUND

Blockchain technology, also known as distributed ledger technology, is an emerging technology in which several computing devices participate in "bookkeeping" and jointly maintain a complete distributed database. Because of the characteristics of decentralization, openness, transparency, each computing device participating in database recording, and rapid data synchronization among the computing devices, the blockchain technology has been widely used in many fields.

SUMMARY

This specification provides a method for auditing authenticity of cross-border resource transfers. The method is implemented on a cross-border resource transfer client. A blockchain accessed by the cross-border resource transfer client stores the proof information that is issued by a cross-border resource transfer receiver and used to prove the authenticity of the cross-border resource transfer information. the method comprises: obtaining the cross-border resource transfer information initiated by a cross-border resource transfer initiator; obtaining, in response to the cross-border resource transfer information, identification information corresponding to the proof information that is stored in the blockchain and corresponds to the cross-border resource transfer information; and generating a cross-border resource transfer request based on the cross-border resource transfer information and the identification information, and sending to a cross-border resource transfer auditor the cross-border resource transfer request, causing the cross-border resource transfer auditor to perform, based on the proof information that is stored in the blockchain and corresponds to the identification information, an authenticity verification on the cross-border resource transfer information.

In an embodiment, a smart contract for managing the proof information is deployed in the blockchain; and obtaining, in response to the cross-border resource transfer information, identification information corresponding to proof information that is stored in the blockchain and corresponds to the cross-border resource transfer information comprises: calling a generation logic in the smart contract in response to the cross-border resource transfer information, to generate the identification information corresponding to the proof information that is stored in the blockchain and corresponds to the cross-border resource transfer information; and obtaining the identification information generated by the smart contract.

In an embodiment, obtaining identification information corresponding to proof information that is stored in the blockchain and corresponds to the cross-border resource transfer information comprises: obtaining the identification information, sent by the cross-border resource transfer receiver, corresponding to the proof information that is stored in the blockchain and corresponds to the cross-border resource transfer information.

In an embodiment, the identification information is a search index for the proof information that is stored in the blockchain and corresponds to the cross-border resource transfer information; and performing, based on the proof information that is stored in the blockchain and corresponds to the identification information, an authenticity verification on the cross-border resource transfer information comprises: searching, based on the identification information, for the proof information corresponding to the identification information; and performing the authenticity verification on the cross-border resource transfer information according to the proof information.

In an embodiment, the identification information is a credible certificate generated based on the proof information that is stored in the blockchain and corresponds to the cross-border resource transfer information; and performing, based on the proof information that is stored in the blockchain and corresponds to the identification information, an authenticity verification on the cross-border resource transfer information comprises: determining whether the credible certificate is generated based on the proof information that is stored in the blockchain and corresponds to the cross-border resource transfer information, and obtaining a result of the determination; and performing, based on the result of the determination, an authenticity verification on the cross-border resource transfer information.

In an embodiment, the proof information comprises cross-border resource transfer order data issued by a cross-border resource transfer receiver.

In an embodiment, the cross-border resource transfer auditor comprises: a cross-border resource transfer acceptor; or a cross-border resource transfer supervisor communicating with a cross-border resource transferrer.

In an embodiment, a method for auditing authenticity of cross-border resource transfers is implemented on a client device. The method comprises: obtaining cross-border resource transfer information initiated by an initiator of a cross-border resource transfer; obtaining, in response to the cross-border resource transfer information, identification information corresponding to proof information that is stored in a blockchain and corresponds to the cross-border resource transfer information; generating a cross-border resource transfer request based on the cross-border resource transfer information and the identification information; and sending, to an auditor of cross-border resource transfers, the cross-border resource transfer request, causing the auditor to perform, based on the proof information that is stored in the blockchain and corresponds to the identification information, an authenticity verification on the cross-border resource transfer information.

In an embodiment, a smart contract for managing the proof information is deployed in the blockchain. The obtaining, in response to the cross-border resource transfer information, identification information corresponding to proof information that is stored in the blockchain and corresponds to the cross-border resource transfer information comprises:

calling, in response to the cross-border resource transfer information, a generation logic in the smart contract to generate the identification information corresponding to the proof information that is stored in the blockchain and corresponds to the cross-border resource transfer information; and obtaining the identification information generated by the smart contract.

In an embodiment, the obtaining identification information corresponding to proof information that is stored in the blockchain and corresponds to the cross-border resource transfer information comprises: obtaining the identification information from a receiver of the cross-border resource transfer.

In an embodiment, the identification information is a search index for the proof information that is stored in the blockchain and corresponds to the cross-border resource transfer information. The performing, based on the proof information that is stored in the blockchain and corresponds to the identification information, an authenticity verification on the cross-border resource transfer information comprises: searching, based on the search index, for the proof information corresponding to the identification information; and performing, based on the proof information, the authenticity verification on the cross-border resource transfer information.

In an embodiment, the identification information is a credible certificate generated based on the proof information that is stored in the blockchain and corresponds to the cross-border resource transfer information. The performing, based on the proof information that is stored in the blockchain and corresponds to the identification information, an authenticity verification on the cross-border resource transfer information comprises: determining whether the credible certificate is generated based on the proof information that is stored in the blockchain and corresponds to the cross-border resource transfer information, and obtaining a result of the determination; and performing, based on the result of the determination, the authenticity verification on the cross-border resource transfer information.

In an embodiment, the proof information comprises cross-border resource transfer order data issued by a receiver of the cross-border resource transfer.

In an embodiment, the auditor of cross-border resource transfers comprises: an acceptor of cross-border resource transfers; or a supervisor of cross-border resource transfers communicating with a cross-border resource transferrer.

This specification further provides a method for auditing authenticity of cross-border resource transfers, implemented on a node device in a blockchain accessed by a cross-border resource transfer client. Here, the blockchain stores therein proof information that is issued by a cross-border resource transfer receiver and used to prove authenticity of cross-border resource transfer information.

The method comprises: receiving a target transaction sent by a cross-border resource transfer auditor, wherein the target transaction comprises the cross-border resource transfer information, and identification information corresponding to the proof information stored in the blockchain; and performing, in response to the target transaction based on the proof information corresponding to the identification information, an authenticity verification on the cross-border resource transfer information, and returning to the cross-border resource transfer auditor a result of the authenticity verification.

In an embodiment, a smart contract for performing an authenticity verification on the cross-border resource transfer information is deployed in the blockchain; the identification information is a search index for the proof information that is stored in the blockchain and corresponds to the cross-border resource transfer information; and performing, in response to the target transaction based on the proof information corresponding to the identification information, an authenticity verification on the cross-border resource transfer information comprises: calling a search logic in the smart contract in response to the target transaction, and searching, based on the identification information, to obtain the proof information that is stored in the blockchain and corresponds to the identification information; and further calling a verification logic in the audit smart contract after the proof information that is stored in the blockchain and corresponds to the identification information is found, and verifying whether the cross-border resource transfer information included in the target transaction matches cross-border resource transfer information indicated by the obtained proof information; if so, determining that the authenticity verification on the cross-border resource transfer information succeeds; otherwise, determining that the authenticity verification on the cross-border resource transfer information fails.

In an embodiment, a smart contract for performing an authenticity verification on the cross-border resource transfer information is deployed in the blockchain; the identification information is a credible certificate generated based on the proof information that is stored in the blockchain and corresponds to the cross-border resource transfer information; and performing, in response to the target transaction based on the proof information corresponding to the identification information, an authenticity verification on the cross-border resource transfer information comprises: calling a certificate check logic in the smart contract, and verifying whether the credible certificate is generated based on the proof information that is stored in the blockchain and corresponds to the cross-border resource transfer information in response to the target transaction; if so, determining that the authenticity verification on the cross-border resource transfer information succeeds; otherwise, determining that the authenticity verification on the cross-border resource transfer information fails.

In an embodiment, returning to the cross-border resource transfer auditor a result of the authenticity verification comprises: monitoring a result of the authenticity verification performed by the smart contract on the cross-border resource transfer information; and returning to the cross-border resource transfer auditor the result of the authenticity verification.

In an embodiment, the cross-border resource transfer auditor comprises: a cross-border resource transfer acceptor; or a cross-border resource transfer supervisor communicating with a cross-border resource transferrer.

In an embodiment. a method for auditing authenticity of cross-border resource transfers is implemented on a node device in a blockchain. The method comprises: receiving a target transaction from an auditor of cross-border resource transfers, wherein the target transaction comprises cross-border resource transfer information, and identification information corresponding to proof information stored in the blockchain; and performing, in response to the target transaction based on the proof information corresponding to the identification information, an authenticity verification on the cross-border resource transfer information, and returning to the auditor a result of the authenticity verification.

This specification further provides a system for auditing authenticity of cross-border resource transfers. The system comprises a processor and a non-transitory computer-readable storage medium storing instructions executable by the processor to cause the system to perform operations comprising: obtaining cross-border resource transfer information initiated by an initiator of a cross-border resource transfer; obtaining, in response to the cross-border resource transfer information, identification information corresponding to proof information that is stored in a blockchain and corresponds to the cross-border resource transfer information; generating a cross-border resource transfer request based on the cross-border resource transfer information and the identification information; and sending, to an auditor of cross-border resource transfers, the cross-border resource transfer request, causing the auditor to perform, based on the proof information that is stored in the blockchain and corresponds to the identification information, an authenticity verification on the cross-border resource transfer information.

This specification further provides a device for auditing authenticity of cross-border resource transfers, implemented on a cross-border resource transfer client, wherein a blockchain accessed by the cross-border resource transfer client stores proof information that is issued by a cross-border resource transfer receiver and used to prove authenticity of cross-border resource transfer information.

The device comprises: a first obtaining module, configured to obtain cross-border resource transfer information initiated by a cross-border resource transfer initiator; a second obtaining module, configured to obtain, in response to the cross-border resource transfer information, identification information corresponding to proof information that is stored in the blockchain and corresponds to the cross-border resource transfer information; and a verification module, configured to generate a cross-border resource transfer request based on the cross-border resource transfer information and the identification information, and sending to a cross-border resource transfer auditor the cross-border resource transfer request, causing the cross-border resource transfer auditor to perform, based on the proof information that is stored in the blockchain and corresponds to the identification information, an authenticity verification on the cross-border resource transfer information.

In an embodiment, a smart contract for managing the proof information is deployed in the blockchain; and the second obtaining module is configured to: call, in response to the cross-border resource transfer information, a generation logic in the smart contract, to generate the identification information corresponding to the proof information that is stored in the blockchain and corresponds to the cross-border resource transfer information; and obtain the identification information generated by the smart contract.

In an embodiment, the second obtaining module comprises: an obtaining sub-module, configured to obtain the identification information, sent by the cross-border resource transfer receiver, corresponding to the proof information that is stored in the blockchain and corresponds to the cross-border resource transfer information.

In an embodiment, the identification information is a search index for the proof information that is stored in the blockchain and corresponds to the cross-border resource transfer information; and the verification module is configured to: searching, based on the identification information, for the proof information corresponding to the identification information; and performing the authenticity verification on the cross-border resource transfer information according to the proof information.

In an embodiment, the identification information is a credible certificate generated based on the proof information that is stored in the blockchain and corresponds to the cross-border resource transfer information; and the verification module is configured to: determine whether the credible certificate is one generated based on the proof information that is stored in the blockchain and corresponds to the cross-border resource transfer information, and obtain a result of the determination; and perform, based on the result of the determination, the authenticity verification on the cross-border resource transfer information.

In an embodiment, the proof information comprises cross-border resource transfer order data issued by a cross-border resource transfer receiver.

In an embodiment, the cross-border resource transfer auditor comprises: a cross-border resource transfer acceptor; or a cross-border resource transfer supervisor communicating with a cross-border resource transferrer.

This specification further provides a device for auditing authenticity of cross-border resource transfers, implemented on a node device in a blockchain accessed by a cross-border resource transfer client, wherein the blockchain stores therein proof information that is issued by a cross-border resource transfer receiver and used to prove authenticity of cross-border resource transfer information.

The device comprises: a receiving module, configured to receive a target transaction sent by a cross-border resource transfer auditor, wherein the target transaction comprises the cross-border resource transfer information, and the identification information corresponding to the proof information stored in the blockchain; and a verification module, configured to perform, in response to the target transaction based on the proof information corresponding to the identification information, an authenticity verification on the cross-border resource transfer information, and returning to the cross-border resource transfer auditor a result of the authenticity verification.

In an embodiment, a smart contract for performing an authenticity verification on the cross-border resource transfer information is deployed in the blockchain; the identification information is a search index for the proof information that is stored in the blockchain and corresponds to the cross-border resource transfer information; and the verification module is configured to: call, in response to the target transaction, a search logic in the smart contract, and search, based on the identification information, to obtain the proof information that is stored in the blockchain and corresponds to the identification information; and further call a verification logic in the audit smart contract after the proof information that is stored in the blockchain and corresponds to the identification information is found, and verify whether the cross-border resource transfer information in the target transaction matches cross-border resource transfer information indicated by the obtained proof information; if so, determine that the authenticity verification on the cross-border resource transfer information succeeds; otherwise, determine that the authenticity verification on the cross-border resource transfer information fails.

In an embodiment, a smart contract for performing the authenticity verification on the cross-border resource transfer information is deployed in the blockchain; the identification information is a credible certificate generated based on the proof information that is stored in the blockchain and corresponds to the cross-border resource transfer information; and the verification module is configured to: call, in response to the target transaction, a certificate check logic in the smart contract, and verify whether the credible certificate is one generated based on the proof information that is stored in the blockchain and corresponds to the cross-border resource transfer information; if so, determine that the authenticity verification on the cross-border resource transfer information succeeds; otherwise, determine that the authenticity verification on the cross-border resource transfer information fails.

In an embodiment, the verification module further comprises: a monitoring module, configured to monitor a result of the authenticity verification performed by the smart contract on the cross-border resource transfer information; and a returning module, configured to return to the cross-border resource transfer auditor the result of the authenticity verification.

In an embodiment, the cross-border resource transfer auditor comprises: a cross-border resource transfer acceptor; or a cross-border resource transfer supervisor communicating with a cross-border resource transferrer.

This specification further provides electronic equipment, which is equipped with a cross-border resource transfer client. a blockchain accessed by the cross-border resource transfer client stores proof information that is issued by a cross-border resource transfer receiver and used to prove authenticity of cross-border resource transfer information; and the equipment comprises: a processor; and a memory used to store processor-executable instructions, wherein the processor is configured to call the executable instructions stored in the memory and implement the method for auditing authenticity of cross-border resource transfers as shown in any one of the above-described embodiments.

This specification further provides electronic equipment, wherein a blockchain accessed by the equipment stores proof information that is issued by a cross-border resource transfer receiver and used to prove authenticity of cross-border resource transfer information; and the equipment comprises: a processor; and a memory used to store processor-executable instructions, wherein the processor is configured to call the executable instructions stored in the memory and implement the method for auditing authenticity of cross-border resource transfers as shown in any one of the above-described embodiments.

Based on the above-described technical solutions, on the one hand, the cross-border resource transfer client may obtain, in response to the cross-border resource transfer information initiated by a cross-border resource transfer initiator, identification information corresponding to the proof information that is stored in the blockchain and corresponds to the cross-border resource transfer information. Then, the cross-border resource transfer client generates a cross-border resource transfer request based on the cross-border resource transfer information and the identification information, and sends to a cross-border resource transfer auditor the cross-border resource transfer request, causing the cross-border resource transfer auditor to perform, based on the proof information that is stored in the blockchain and corresponds to the identification information, an authenticity verification on the cross-border resource transfer information, thereby avoiding human participation when the authenticity audit is performed on the cross-border resource transfer information, and improving efficiency and accuracy of the authenticity audit.

On the other hand, after receiving a target transaction sent by a cross-border resource transfer auditor, a node device in a blockchain accessed by the cross-border resource transfer client may perform, in response to the target transaction based on the proof information corresponding to the identification information, an authenticity verification on the cross-border resource transfer information, and return to the cross-border resource transfer auditor a result of the authenticity audit, thereby avoiding human participation when the authenticity audit is performed on a cross-border resource transfer, and improving efficiency and accuracy of the authenticity audit.

DETAILED DESCRIPTION

Figure 1:
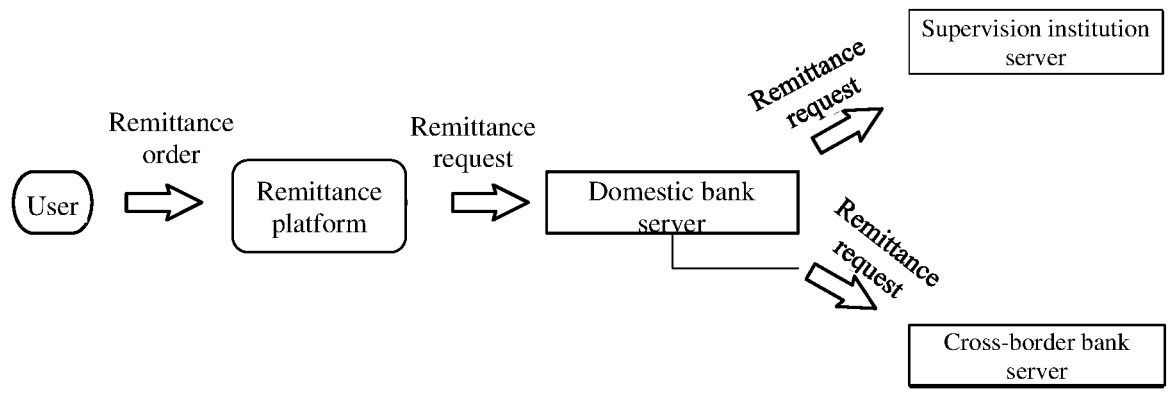
FIG. 1 is a process flow diagram of a cross-border remittance according to this specification.

Embodiments are described below in detail, and examples thereof are illustrated in the accompanying drawings. When the description below involves the accompanying drawings, unless otherwise stated, the same numbers in different accompanying drawings represent the same or similar elements. The implementation manners described in the following embodiments do not represent all implementation manners consistent with one or more embodiments of this specification. They are examples of devices and methods consistent with some aspects of one or more embodiments of this specification as detailed in the appended claims.

It should be noted that in other embodiments, the steps of corresponding method may not be implemented in an order shown and described in this specification. In some other embodiments, the method may include more or fewer steps than those described in this specification. In addition, a single step described in this specification may be split into more steps for description in other embodiments, and more steps described in this specification may also be combined into a single step for description in other embodiments.

A blockchain is generally classified into three types: public blockchain, private blockchain, and consortium blockchain. In addition, there may also be a combination of the above-described types, such as private blockchain+consortium blockchain, consortium blockchain+public blockchain, etc.

The public blockchain has the highest degree of decentralization. The public blockchain may be represented by Bitcoin and Ethereum. Participants joining the public blockchain (also called nodes in the blockchain) may read data records on the blockchain, participate in transactions, and compete for the bookkeeping rights to new blocks, etc. Moreover, each node may freely join or exit the network and perform relevant operations.

In the private blockchain, on the other hand, the write permission for the network is controlled by an organization or institution, and the data reading permission is regulated by an organization. In brief, the private chain may be seen a weakly-centralized system, which imposes strict restrictions on nodes and has a small number of nodes. This type of blockchain is more suitable for internal use by some institutions.

The consortium blockchain is a blockchain between the public blockchain and the private blockchain, which may achieve "partial decentralization". Each node in the consortium blockchain generally has a corresponding entity or organization, and the nodes join the network after being authorized and form a stakeholder consortium to jointly maintain the operation of the blockchain.

Based on the basic characteristics of the blockchain, the blockchain is generally composed of several blocks. Time stamps, which correspond to the creation times of these blocks, are respectively recorded therein. All blocks strictly follow the time stamps recorded therein to form a time series data chain.

The real data generated from the physical world may be constituted into a standard transaction format supported by the blockchain, and then published to the blockchain. A node device in the blockchain performs consensus processing on the received transaction. After a consensus is reached, a node device serving as a bookkeeping node in the blockchain packages this transaction into the block as a permanent ledger in the blockchain.

Here, the consensus algorithms supported in the blockchain may include:

a first type of consensus algorithms, referring to consensus algorithms in which the node devices need to compete for the bookkeeping right in each bookkeeping cycle, such as POW (Proof of Work), POS (Proof of Stake), DPOS (Delegated Proof of Stake), etc.; and a second type of consensus algorithms, referring to consensus algorithms in which bookkeeping nodes are pre-selected for each bookkeeping cycle (without the need of competing for the bookkeeping right), such as PBFT (Practical Byzantine Fault Tolerance).

In a blockchain network using the first type of consensus algorithms, after a transaction is received, all node devices competing for the bookkeeping right may execute this transaction. One of the node devices competing for the bookkeeping right may win this round of competition for the bookkeeping right and becomes a bookkeeping node. The bookkeeping node may package the received transaction with other transactions to generate the latest block, and send to other node devices the generated latest block or a block header of the latest block for a consensus.

In a blockchain network using the second type of consensus algorithms, the node device having the bookkeeping right is already agreed upon before a current round of bookkeeping. Therefore, after a node device receives a transaction, if said node device is not a bookkeeping node of this round, it may send the transaction to the bookkeeping node. The bookkeeping node of this round may execute this transaction when or before packaging this transaction with other transactions to generate the latest block. After generating the latest block, the bookkeeping node may send to other node devices the latest block or the block header of the latest block for a consensus.

As described above, no matter which above consensus algorithm is adopted by the blockchain, the bookkeeping node of this round may package the received transaction with other transactions to generate the latest block, and send to other node devices the generated latest block or the block header of the latest block for a consensus verification. After other node devices receive the latest block or the block header of the latest block, if no issues are found after verification, the node devices may add the latest block to the end of the original blockchain to complete the bookkeeping process of the blockchain. When verifying the new block or the block header sent by the bookkeeping node, other nodes may also execute the transaction included in the block.

In some applications, a public blockchain, a private blockchain, and a consortium blockchain may all provide a function of smart contracts. A smart contract on a blockchain is a contract that may be triggered by a transaction for execution on the blockchain. A smart contract may be defined using codes.

Take Ethereum as an example, Ethereum supports a user to create and call some complex logics in the Ethereum network. Ethereum is a programmable blockchain with EVM (Ethereum Virtual Machine) as the core, and each Ethereum node may run the EVM. EVM is a Turing-complete virtual machine, through which various complex logics may be implemented. A user publishes and calls a smart contract in Ethereum through the EVM. In practice, since EVM directly runs virtual machine codes (virtual machine bytecodes, hereinafter referred to as "bytecodes"), the smart contract deployed on the blockchain may be bytecodes.

After a smart contract is created, a contract account corresponding to the smart contract appears on the blockchain and has a particular address. A contract code (Code) and account storage (Storage) are stored in the account storage of the contract account. Behaviors of the smart contract are controlled by the contract code, and the account storage of the smart contract saves the state of the contract. In other words, the smart contract causes the generation of a virtual account having a contract code and account storage on the blockchain.

As mentioned above, a Data field that includes a transaction for creating a smart contract may store the bytecodes of the smart contract. The bytecode consists of a string of bytes, and each byte may identify an operation. By taking many aspects such as development efficiency and readability into consideration, a developer may choose a high-level language to write the codes of the smart contract instead of directly writing bytecodes. In some embodiments, the high-level language may be Solidity, Serpent, LLL, etc. The codes of the smart contract written with a high-level language may be compiled by a compiler to generate bytecodes that may be deployed on the blockchain.

Take Solidity as an example, the contract codes written with Solidity are very similar to the Class in the object-oriented programming language. Various members may be declared in a contract, including state variables, functions, function modifiers, events, etc. The state variable is a value permanently stored in the account storage (Storage) field of the smart contract for saving the state of the contract.

The smart contract may be executed independently on each node in the blockchain network in a prescribed manner, and all execution records and data are stored on the blockchain. Thus, when such a transaction is completed, the blockchain stores a transaction certificate that cannot be altered and will not be lost.

Creation of a smart contract in Ethereum needs the processes of writing a smart contract, turning it into bytecodes, and deploying the bytecodes to the blockchain, etc. Calling a smart contract in Ethereum is to initiate a transaction targeting the address of the smart contract. The EVM of each node may execute the transaction separately, and the codes of the smart contract are run in a distributed manner in the virtual machine of each node in the Ethereum network.

In related technologies, a cross-border resource transfer refers to a process of a resource transfer initiator transferring resources to an overseas resource transfer receiver. In the process flow of a cross-border resource transfer, all institutions involved in the cross-border resource transfer need to perform an authenticity audit on information such as the purpose of the cross-border resource transfer and the flow direction of the resource transfer.

In some applications, the above-described cross-border resource transfer may include a cross-border virtual resource transfer and a cross-border physical resource transfer. The cross-border virtual resources may include virtual tokens (Bitcoin, Ethereum, etc.), points, stocks, etc., and the cross-border physical resource transfer may include cross-border remittances, etc.

In some embodiments, when a remittance initiator initiates a cross-border remittance, all institutions involved in the cross-border remittance process need to perform an authenticity audit on information such as the purpose of the cross-border remittance and the flow direction of the remittance. After the authenticity audit is performed and successful, the process flow of the cross-border remittance is continued until the cross-border remittance is completed.

Here, the institutions may include a domestic bank institution, a remittance supervision institution, and an overseas bank institution.

FIG. 1 shows a process flow diagram of a cross-border remittance according to this specification.

As shown in FIG. 1, a remittance initiator may interact with a remittance platform, and the remittance platform may interact with a domestic bank institution. The domestic bank institution may interact with a supervision institution and an overseas bank institution respectively.

The remittance platform may, in response to a cross-border remittance order initiated by the remittance initiator, initiate a cross-border remittance request and send the request to the domestic bank institution.

After receiving the cross-border remittance request initiated by the remittance platform, the domestic bank institution needs to perform an authenticity audit on remittance information of the cross-border remittance request, and sends to the supervision institution the cross-border remittance request after the authenticity audit is successfully completed, and processing of the cross-border remittance continues.

After receiving the cross-border remittance request, the supervision institution needs to perform an authenticity audit on remittance information related to the cross-border remittance request, and allows the domestic bank institution to send the cross-border remittance request to the overseas bank institution after the authenticity audit is successfully completed.

After receiving an acknowledge receipt allowing further processing of the cross-border remittance from the supervision institution, the domestic bank institution may continue to send to the overseas bank institution the cross-border remittance request.

After receiving the cross-border remittance request, the overseas bank institution needs to perform an authenticity audit on remittance information of the cross-border remittance request, and processes the cross-border remittance request to complete the cross-border remittance initiated by the remittance initiator after the authenticity audit is successfully completed.

Here, when the cross-border remittance request circulates among the above-described institutions, each of the institutions needs to perform an authenticity audit on remittance information (for example, the purpose of remittance) of the cross-border remittance request. At present, when the above-described institutions perform an authenticity audit on remittance information (for example, the purpose of remittance) of the cross-border remittance request, this is usually done by the employees from the institutions contacting the remittance initiator, thereby obtaining the information that may prove authenticity of the above-described relevant information. Only after obtaining the proof information, the employees from the institutions may perform an authenticity audit on the proof information.

The current authenticity audit of a cross-border remittance requires human participations as well as several interactions with the remittance initiator. Thus, the technical problems such as low efficiency and high error rate of authenticity audit are present.

Based on this, this specification provides a method for auditing authenticity of cross-border resource transfers. In the method, the proof information issued by a cross-border resource transfer receiver and used to prove authenticity of the cross-border resource transfer is stored in a blockchain, causing the cross-border resource transfer auditor to search, when performing an authenticity audit on the cross-border resource transfer information initiated by a cross-border resource transfer initiator (an initiator of a cross-border resource transfer), the blockchain for the proof information matching the cross-border resource transfer information through a corresponding node device, and determine a result of the authenticity audit of the cross-border resource transfer based on the searched proof information, thereby avoiding human participations in an authenticity audit on a cross-border resource transfer, and improving efficiency and accuracy of the authenticity audit.

For example, on one aspect, this specification provides a method for auditing authenticity of cross-border resource transfers. The method is implemented on a cross-border resource transfer client or a client device.

Figure 2:
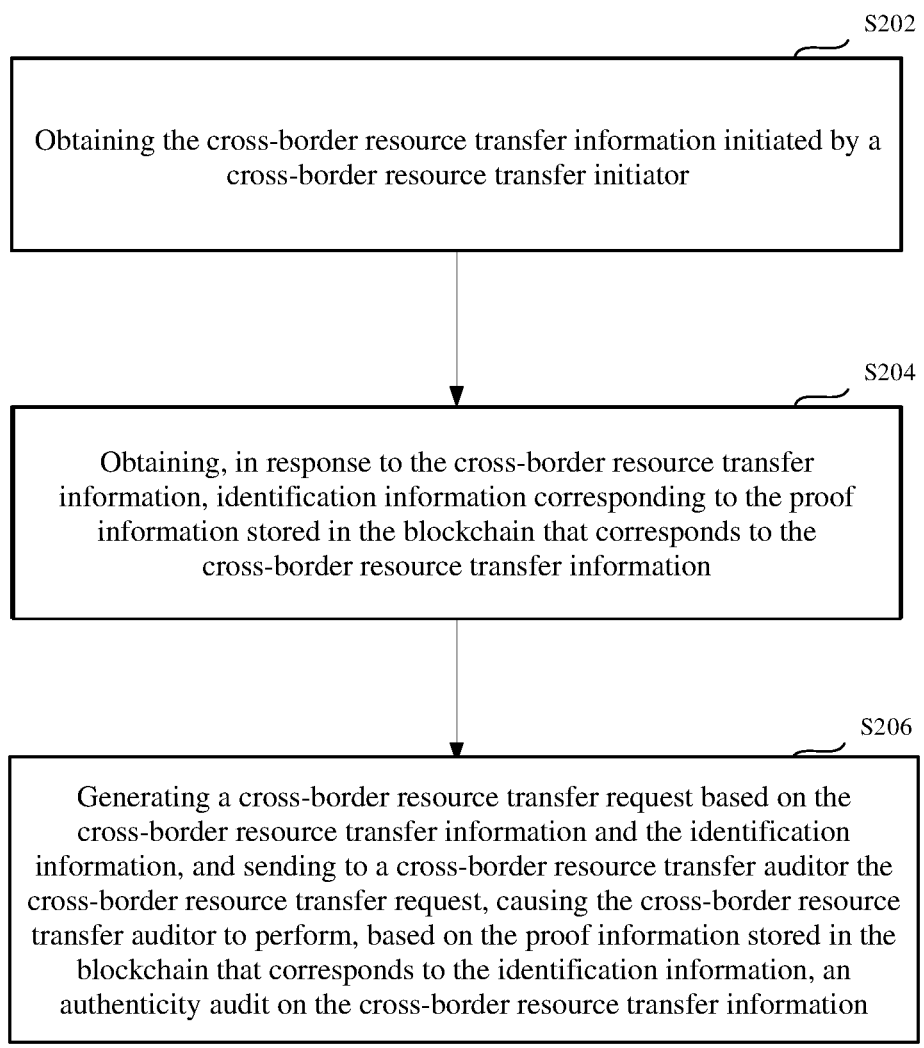
FIG. 2 is a process flow diagram of a method for auditing authenticity of cross-border resource transfers according to this specification.

FIG. 2 shows a process flow diagram of a method for auditing authenticity of cross-border resource transfers according to this specification. The method is implemented on a cross-border resource transfer client. Here, a blockchain accessed by the cross-border resource transfer client stores proof information issued by a cross-border resource transfer receiver and is used to prove authenticity of the cross-border resource transfer information.

As shown in FIG. 2, the method comprises:

S202: obtaining the cross-border resource transfer information initiated by a cross-border resource transfer initiator;

S204: obtaining, in response to the cross-border resource transfer information, identification information corresponding to the proof information that is stored in the blockchain and corresponds to the cross-border resource transfer information; and

S206: generating a cross-border resource transfer request based on the cross-border resource transfer information and the identification information, and sending to a cross-border resource transfer auditor (an auditor of cross-border resource transfers) the cross-border resource transfer request, causing the cross-border resource transfer auditor to perform, based on the proof information that is stored in the blockchain and corresponds to the identification information, an authenticity audit on the cross-border resource transfer information.

Here, the blockchain may be a public blockchain, a private blockchain, or a consortium blockchain established based on a server or a server cluster. The blockchain stores proof information issued by a cross-border resource transfer receiver (a receiver of the cross-border resource transfer) and used to prove authenticity of the cross-border resource transfer information. In some applications, in order to achieve an authenticity audit on the cross-border resource transfer information, the system for auditing authenticity of cross-border resource transfers may be established based on the blockchain, which is implemented on the node devices disposed on the blockchain, causing the cross-border resource transfer auditor to complete the authenticity audit for a cross-border resource transfer.

The cross-border resource transfer auditor is an auditor that performs an authenticity audit on a cross-border resource transfer in a cross-border resource transfer transaction. The cross-border resource transfer auditor may include a cross-border resource transfer acceptor (an acceptor of cross-border resource transfers), or a cross-border resource transfer supervisor (a supervisor of cross-border resource transfers) communicating with the cross-border resource transferrer.

In some embodiments, in a cross-border remittance scenario, the cross-border resource transfer acceptor may be a domestic bank institution, an overseas bank institution, etc. The cross-border resource transfer supervisor may include a supervision institution, and the like.

The cross-border resource transfer initiator is an entity or an individual that initiates a cross-border resource transfer.

In some embodiments, in a cross-border remittance scenario, the cross-border resource transfer initiator may be a remittance initiator. The remittance initiator may initiate a cross-border remittance order through a cross-border remittance client.

The cross-border resource transfer information is information initiated by a cross-border resource transfer initiator and used for a cross-border resource transfer.

In some embodiments, in a cross-border remittance scenario, the cross-border resource transfer information may be cross-border remittance information. The cross-border remittance information may be information relevant to the cross-border remittance and written by a remittance initiator when initiating a cross-border remittance order. In practice, the remittance information may be information that needs to be provided for a cross-border remittance per relevant regulations, such as the amount of remittance, purpose of remittance, remittee and remittance initiator (for example, identification information of the remittance initiator, account information, etc.).

The cross-border resource transfer request is a cross-border resource transfer request initiated by the cross-border resource transfer client. After receiving the cross-border resource transfer information initiated by a cross-border resource transfer initiator, the cross-border resource transfer client may obtain, in response to the cross-border resource transfer information, identification information corresponding to the proof information that is stored in the blockchain and corresponds to the cross-border resource transfer information, and generate a cross-border resource transfer request based on the cross-border resource transfer information and the identification information.

After generating the cross-border resource transfer request, the cross-border resource transfer client may send to a cross-border resource transfer auditor the cross-border resource transfer request, causing the authenticity audit on the cross-border resource transfer to be completed.

The cross-border resource transfer receiver is an entity or an individual that receives the cross-border resource.

In some embodiments, in a cross-border remittance scenario, the cross-border resource transfer receiver may be a remittee of the cross-border remittance.

The remittee may have different roles in different transaction scenarios. In some embodiments, in an overseas shopping scenario, the remittee may be an institution that provides commodities. In an overseas elderly care scenario, the remittee may be a nursing home that provides elderly care services. The remittee may certainly be an individual that receives the remittance. In some embodiments, when a remittance initiator provides living expenses to a relative living abroad, the remittee may be a relative of the remittance initiator.

The proof information may be a proof document that can prove that cross-border resource transfer information is a real transaction. In practice, the proof information may be used to prove that a resource transfer relationship between a cross-border resource transfer initiator and a cross-border resource transfer receiver is true.

In practice, the proof information includes cross-border resource transfer order data issued by a cross-border resource transfer receiver.

In some embodiments, in an overseas shopping scenario, the proof information may be a cross-border order showing that the remittance initiator purchases goods from an overseas merchant (remittee). In this case, the cross-border order may prove that the remittance initiator has indeed purchased goods from the overseas merchant, and that the remittance initiator needs to pay a remittance (provide a payment) to the overseas merchant (remittee).

In some other embodiments, in a scenario where a remittance initiator provides living expenses to a relative living abroad, the proof information may be a document for proving a direct relationship between the remittance initiator and the relative living abroad. In this case, the proof information may prove that the remittance initiator needs to pay a remittance (to provide living expenses) to the remittee.

In some applications, the cross-border resource transfer receiver may issue, through a node device included in the blockchain and corresponding to the receiver, the proof information used to prove authenticity of a cross-border resource transfer to the blockchain for storage, causing an authenticity audit node included in the system for auditing authenticity of cross-border resource transfers to trace the cross-border resource transfer information.

Here, the node device may be any type of terminal devices, such as a personal PC, a mobile phone terminal, a PAD terminal, and the like.

When the cross-border resource transfer receiver issues the proof information to the blockchain for storage, the blockchain may also generate the identification information corresponding to the proof information and store the identification information.

In some applications, a smart contract for managing the proof information may be preset in the blockchain. A logical algorithm (such as a Hash algorithm) for generating identification information may be deployed in the smart contract. After receiving the proof information sent by the cross-border resource transfer receiver, the system for auditing authenticity of cross-border resource transfers may call, in response to the proof information, the preset smart contract for managing the proof information, and generate the identification information corresponding to the proof information.

The identification information may be a search index for the proof information that is stored in the blockchain and corresponds to the cross-border resource transfer information, or a credible certificate generated based on the proof information that is stored in the blockchain and corresponds to the cross-border resource transfer information.

When the identification information is a search index for the proof information that is stored in the blockchain and corresponds to the cross-border resource transfer information, during the authenticity audit, proof information corresponding to the identification information may be obtained from the blockchain through the identification information. After proof information is obtained, an authenticity audit may be implemented based on the proof information.

When the identification information is a credible certificate generated based on the proof information that is stored in the blockchain and corresponds to the cross-border resource transfer information, the authenticity audit may be implemented through verifying whether the credible certificate is generated based on the proof information that is stored in the blockchain and corresponds to the cross-border resource transfer information.

In one embodiment, the identification information may also be used to indicate actual content included in proof information corresponding to the identification information.

In some embodiments, in a cross-border remittance scenario, the logical algorithm for generating identification information may be an algorithm that maps related information of remittance information into a corresponding identity. In some embodiments, 0 may be used to represent a remittance for payment of goods (purpose of remittance), 1 may be used to represent a remittance for living expenses, Arabic numerals corresponding to an amount of remittance may be used as an identity indicating the amount of remittance, identification card information or passport information of a remittance initiator may be used to indicate identification information corresponding to the remittance initiator, etc.

In this case, during generation of identification information corresponding to remittance information, various kinds of information included in the remittance information may be mapped to corresponding identities, and the identities corresponding to various kinds of information are combined according to a preset rule. Then, an ID that may uniquely mark remittance information is added and combined as identification information corresponding to the remittance information.

The cross-border resource transfer client (hereinafter referred to as the "client") is a client (such as a bank client APP) that provides cross-border resource transfer services for the cross-border resource transfer initiator. The cross-border resource transfer client may be carried on a cross-border resource transfer initiator node device in the blockchain. Here, the cross-border resource transfer initiator node device may be any type of terminal devices, such as a personal PC, a mobile phone terminal, a PAD terminal, and the like.

After receiving the cross-border resource transfer information initiated by a cross-border resource transfer initiator, the client may obtain, in response to the cross-border resource transfer information, identification information corresponding to the proof information that is stored in the blockchain and corresponds to the cross-border resource transfer information, and generate a cross-border resource transfer request based on the cross-border resource transfer information and the identification information.

After generating the cross-border resource transfer request, the client may send to a cross-border resource transfer auditor the cross-border resource transfer request, causing an authenticity audit on the cross-border resource transfer to be completed.

In some applications, a smart contract for managing the proof information is deployed in the blockchain. When obtaining identification information corresponding to the proof information that is stored in the blockchain and corresponds to the cross-border resource transfer information, the client may, in response to the cross-border resource transfer information, call a generation logic in the smart contract, and generate the identification information corresponding to the proof information that is stored in the blockchain and corresponds to the cross-border resource transfer information. After the identification information is generated, the client may obtain the identification information generated by the smart contract.

A smart contract for calling and used to obtain identification information may be pre-deployed in the blockchain. After receiving the cross-border resource transfer information initiated by a cross-border resource transfer initiator, the client may create, in response to the cross-border resource transfer information, a transaction for calling the smart contract. After a transaction for calling is created, the client may send the transaction for calling to the cross-border resource transfer initiator node device.

After receiving the transaction for calling, the cross-border resource transfer initiator node device may, in response to the transaction for calling, call an obtaining logic in the smart contract for calling to obtain the identification information that is found from the blockchain and corresponds to the proof information corresponding to the cross-border resource transfer information, and write the identification information into a state database of the blockchain.

The client may monitor the state database, and obtain the identification information from the state database.

In a subsequent process flow of a cross-border resource transfer, when a cross-border resource transfer auditor receives the cross-border resource transfer request, the cross-border resource transfer auditor may create a target transaction through a system for auditing authenticity of cross-border resource transfers established based on the blockchain, causing a node device in the blockchain to respond to the target transaction and implement an authenticity audit on the cross-border resource transfer.

In some embodiments, in a cross-border remittance scenario, when a cross-border remittance client sends to a domestic bank institution node device a cross-border remittance request initiated by a remittance initiator, the domestic bank institution may create a target transaction through the system for auditing authenticity of cross-border resource transfers. After the target transaction is created, the system for auditing authenticity of cross-border resource transfers may send the target transaction to a node device corresponding to the domestic bank institution. After receiving the target transaction, the device may perform, in response to the target transaction, an authenticity audit on the cross-border remittance request. After the authenticity audit on the cross-border remittance request succeeds, the domestic bank institution node device sends to a supervision institution node device the transaction for an authenticity audit.

In one embodiment, when obtaining identification information corresponding to the proof information that is stored in the blockchain and corresponds to the cross-border resource transfer information, the client may obtain identification information corresponding to the proof information sent by a cross-border resource transfer receiver and stored in the blockchain and corresponds to the cross-border resource transfer information.

In some applications, the cross-border resource transfer receiver may send to a cross-border resource transfer initiator the identification information offline, causing the initiator to send to the client the cross-border resource transfer information and the identification information together.

In some embodiments, the cross-border resource transfer receiver may send to a cross-border resource transfer initiator the identification information in a trusted manner (such as mails, text messages, etc.). When initiating a cross-border resource transfer, the cross-border resource transfer initiator may send to the client the identification information together with the cross-border resource transfer information.

Based on the above-described technical solutions, on the one hand, the client may obtain, in response to the cross-border resource transfer information initiated by a cross-border resource transfer initiator, identification information corresponding to the proof information that is stored in the blockchain and corresponds to the cross-border resource transfer information. Then, the client generates a cross-border resource transfer request based on the cross-border resource transfer information and the identification information, and sends to a cross-border resource transfer auditor the cross-border resource transfer request, causing the cross-border resource transfer auditor to perform, based on the proof information that is stored in the blockchain and corresponds to the identification information, an authenticity verification on the cross-border resource transfer information, thereby avoiding human participations in the authenticity audit on the cross-border resource transfer information and improving efficiency and accuracy of the authenticity audit.

On the other hand, this specification provides a method for auditing authenticity of cross-border resource transfers. The method is implemented on a node device in a blockchain accessed by a cross-border resource transfer client.

Figure 3:
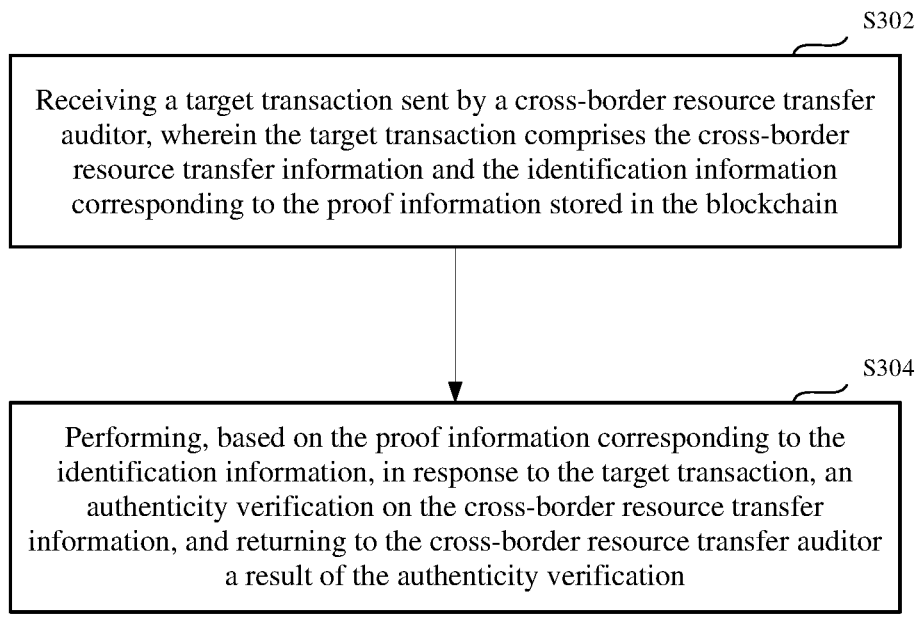
FIG. 3 is a process flow diagram of a method for auditing authenticity of cross-border resource transfers according to this specification.

Refer to FIG. 3, which shows a process flow diagram of a method for auditing authenticity of cross-border resource transfers according to this specification. The method may be implemented on a node device in a blockchain accessed by a cross-border resource transfer client. Here, the blockchain stores proof information issued by a cross-border resource transfer receiver and used to prove authenticity of cross-border resource transfer information.

As shown in FIG. 3, the method may comprise:

S302: receiving a target transaction sent by a cross-border resource transfer auditor, wherein the target transaction comprises the cross-border resource transfer information and the identification information corresponding to the proof information stored in the blockchain; and S304: performing, based on the proof information corresponding to the identification information, in response to the target transaction, an authenticity verification on the cross-border resource transfer information, and returning to the cross-border resource transfer auditor a result of the authenticity verification.

The cross-border resource transfer auditor is an auditor that needs to perform an authenticity audit on a cross-border resource transfer in a cross-border resource transfer transaction service. The cross-border resource transfer auditor may include a cross-border resource transfer acceptor, or a cross-border resource transfer supervisor communicating with the cross-border resource transferrer.

In some embodiments, in a cross-border remittance scenario, the cross-border resource transfer acceptor may be a domestic bank institution, an overseas bank institution, etc. The cross-border resource transfer supervisor may include a supervision institution, and the like.

The target transaction may be created by the cross-border resource transfer auditor after receiving a cross-border resource transfer request. The target transaction may include the to-be-audited cross-border resource transfer information, and the identification information corresponding to the proof information stored in the blockchain.

After a node device in a blockchain accessed by a cross-border resource transfer client receives the target transaction, the node device may perform, in response to the target transaction based on the proof information corresponding to the identification information, an authenticity verification on the cross-border resource transfer information, and return to the cross-border resource transfer auditor a result of the authenticity verification.

In one scenario, a smart contract used to perform an authenticity verification on the cross-border resource transfer information is deployed in the blockchain. The identification information is a search index for the proof information that is stored in the blockchain and corresponds to the cross-border resource transfer information.

In this case, when performing, in response to the target transaction based on the proof information corresponding to the identification information, an authenticity verification on the cross-border resource transfer information, the node device may call a search logic in the smart contract, and search, based on the identification information, for the proof information that is stored in the blockchain and corresponds to the identification information.

After obtaining the proof information, the node device may further call a verification logic in the smart contract for audit after the proof information that is stored in the blockchain and corresponds to the identification information is found, and verify whether cross-border resource transfer information included in the target transaction matches cross-border resource transfer information indicated by the obtained proof information. If so, the node device determines that the authenticity verification on the cross-border resource transfer information succeeds, otherwise, the node device determines that the authenticity verification on the cross-border resource transfer information fails.

In another scenario, a smart contract for performing an authenticity verification on the cross-border resource transfer information is deployed in the blockchain, and the identification information is a credible certificate generated based on the proof information that is stored in the blockchain and corresponds to the cross-border resource transfer information.

In this case, when performing, in response to the target transaction based on the proof information corresponding to the identification information, an authenticity verification on the cross-border resource transfer information, the node device may call a certificate check logic in the smart contract, and verify whether the credible certificate is generated based on the proof information that is stored in the blockchain and corresponds to the cross-border resource transfer information. If so, the node device determines that the authenticity verification on the cross-border resource transfer information succeeds, otherwise, the node device determines that the authenticity verification on the cross-border resource transfer information fails.

In another scenario, the identification information may also be used to indicate actual content included in proof information corresponding to the identification information.

In this case, when performing, in response to the target transaction based on the proof information corresponding to the identification information, an authenticity verification on the cross-border resource transfer information, the node device may first analyze identification information included in the target transaction and obtain the related information indicated by the identification information.

Then, the node device compares the obtained related information indicated by the identification information with the found cross-border resource transfer information.

If the related information is consistent with the cross-border resource transfer information, the node device determines that the authenticity audit on the cross-border resource transfer succeeds. Otherwise, the node device determines that the authenticity audit on the cross-border resource transfer fails.

In the above-described scenarios, after any of the smart contracts obtains a result of the authenticity audit of the cross-border resource transfer, the node device may generate a write event based on an event mechanism, and write the result of the authenticity audit into a state database of the blockchain, causing the cross-border resource transfer auditor to monitor the state database and obtain the result of the authenticity audit.

As described above, after receiving a target transaction sent by a cross-border resource transfer auditor, a node device in a blockchain accessed by the cross-border resource transfer client may perform, in response to the target transaction based on the proof information corresponding to the identification information, an authenticity verification on the cross-border resource transfer information, and return to the cross-border resource transfer auditor a result of the authenticity audit, thereby avoiding human participations in the authenticity audit on a cross-border resource transfer and improving efficiency and accuracy of the authenticity audit.

The embodiments of this specification are described below in detail in conjunction with an overseas shopping scenario.

Figure 4:
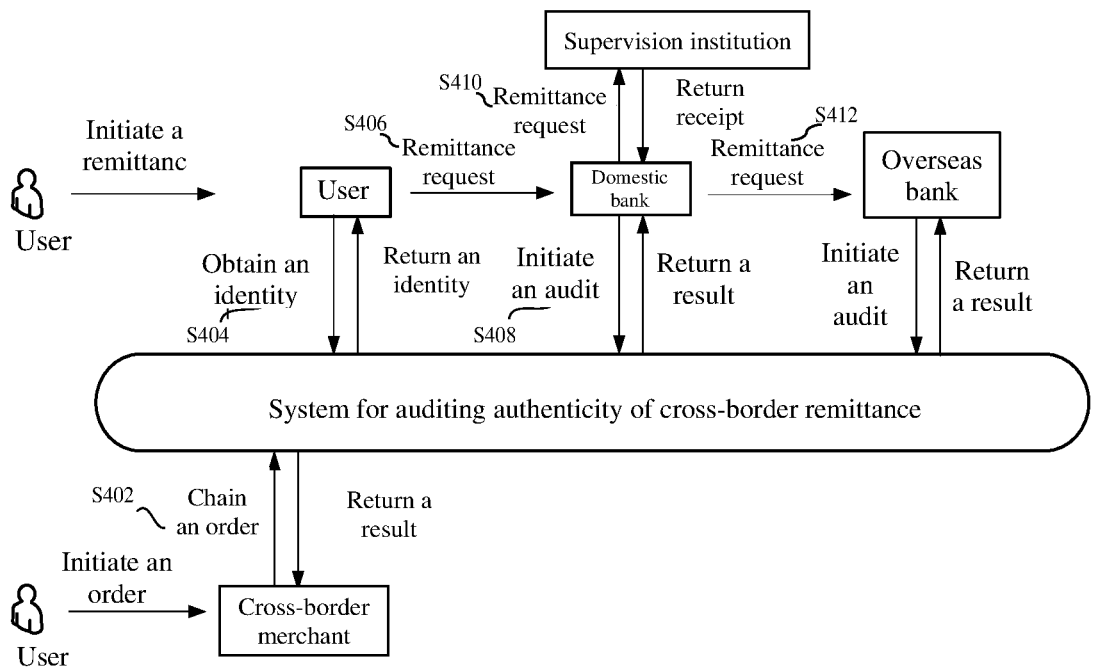
FIG. 4 is a process flow diagram of a cross-border remittance according to this specification.

Refer to FIG. 4, which shows a process flow diagram of a cross-border remittance according to this specification. As shown in FIG. 4, a system for auditing authenticity of cross-border resource transfers is established based on a blockchain. Here, the blockchain comprises a user node device (equipped with a cross-border remittance client), an overseas merchant node device, a domestic bank institution node device, an overseas bank institution node device, and a supervision institution node device.

Suppose that a user (remittance initiator) places a cross-border order with an overseas merchant (remittee), and an overseas merchant node device corresponding to the overseas merchant generates corresponding order data based on the cross-border order, wherein the order data may include the identification information (such as ID number) of the user.

In the above-described scenario, the overseas merchant node device may execute S402 to issue order data related to the cross-border order to the blockchain, causing the blockchain to generate identification information corresponding to the order data, and store the order data as well as the identification information.

In one embodiment, the overseas merchant node device may package a ledger transaction based on the order data, and send to the node devices included in the blockchain the ledger transaction. After the node devices in the blockchain reach a consensus, the overseas merchant node device issues the order data to the system for auditing authenticity of cross-border resource transfers for storage. After the order data is stored, the overseas merchant node device may also call a generation logic in a pre-deployed smart contract for identification information generation, generate identification information corresponding to the order data based on a logical algorithm in the smart contract, and store the identification information in the system for auditing authenticity of cross-border resource transfers.

Implementation manners for the blockchain generating identification information corresponding to the order data and storing the order data and the identification information are not limited by this specification. In some embodiments, a smart contract may be pre-deployed in the blockchain, and the smart contract may include an order data storage logic and an identification information generation logic. In this case, the overseas merchant node device may call the smart contract, causing the blockchain to generate identification information corresponding to the order data, and store the order data as well as the identification information.

After the order data and the identification information corresponding to the order data are stored in the blockchain, the blockchain may return to the overseas merchant node device the receipt information indicating a successful storage, causing the overseas merchant node device to feed back the generated order data to the user, who then initiates a cross-border remittance order based on the order data.

After receiving the order data (such as receiving the order data through a purchasing website provided by the merchant), the user may initiate a cross-border remittance order through an overseas cross-border client loaded in the user node device. Here, the cross-border remittance order may carry identification information of the user (such as an ID number), and cross-border remittance information created based on the order data.

After receiving the cross-border remittance order, the remittance client may execute S404 to: create, in response to the target cross-border remittance order, a transaction for calling and obtaining a smart contract.

After sending to a remittance initiator node device corresponding to the cross-border remittance client the transaction for calling and obtaining a smart contract, the cross-border remittance initiator node device calls, in response to the transaction for calling and obtaining a smart contract, an obtaining logic in the smart contract, obtain identification information of proof information that is searched from the blockchain and corresponds to the target cross-border remittance order, and write the identification information into a state database of the blockchain.

The state database is monitored, and the identification information is obtained from the state database.

After the remittance client obtains the identification information, it may indicate that order data corresponding to the identification information is already stored in the system for auditing authenticity of cross-border resource transfers, and that a remittance request initiated by the user is already associated with the order data.

In this case, the remittance client may execute S406 to generate, based on the cross-border remittance information and the identification information, a target cross-border remittance request for the target cross-border remittance order, and send to the domestic bank institution the target cross-border remittance request.

After receiving the target cross-border remittance request, the domestic bank institution may execute S408 through a system for auditing authenticity of cross-border resource transfers carried in corresponding domestic bank institution node device to create, based on the cross-border remittance request, a target transaction for performing an authenticity audit on the cross-border remittance information of the target cross-border remittance order, and send to the domestic bank institution node device the target transaction.

When receiving the target transaction, the domestic bank institution node device may call, in response to the target transaction, a search logic in the smart contract for audit, and search, based on the identification information, for the proof information that is stored in the blockchain and corresponds to the identification information. When the smart contract for audit finds the proof information from the blockchain, the node device may further call a verification logic in the smart contract for audit, and perform, based on the proof information, an authenticity audit on the cross-border remittance information of the target cross-border remittance order.

In one embodiment, when performing an authenticity audit on the cross-border remittance information of the target cross-border remittance order, the node device may compare the proof information with cross-border remittance information of the target cross-border remittance order, and obtain a result of the comparison.

If the result of the comparison is consistent, the node device determines that the authenticity audit on the cross-border resource transfer succeeds. Otherwise, the node device determines that the authenticity audit on the cross-border resource transfer fails.

In another embodiment, the identification information is used to indicate related information included in proof information corresponding to the identification information.

When performing an authenticity audit on the cross-border remittance information of the cross-border remittance order, the node device may first analyze identification information included in the target transaction, and obtain the related information indicated by the identification information.

Then, the node device compares the obtained related information indicated by the identification information with the related information included in the obtained proof information.

If the related information is consistent, the node device determines that the authenticity audit on the cross-border resource transfer succeeds. Otherwise, the node device determines that the authenticity audit on the cross-border resource transfer fails.

In the above-described scenario, after the smart contract for audit determines a result of the authenticity audit of the cross-border remittance order, the node device may generate a write event based on an event mechanism, and write the result of the authenticity audit into a state database of the blockchain.

The domestic bank institution node device may monitor the state database, and obtain the result of the authenticity audit when the write event is detected.

If the domestic bank institution node device determines that the authenticity audit on the cross-border remittance information of the target cross-border remittance order succeeds, the domestic bank institution may execute S410 to send to the supervision institution the target cross-border remittance request, causing the supervision institution to perform an authenticity audit on the target cross-border remittance request through a supervision institution node device. Here, the step in which the supervision institution node device performs an authenticity audit on the cross-border remittance information of the target cross-border remittance request may refer to the above-mentioned authenticity audit process of the domestic bank institution node device, which is not elaborated herein.

When the supervision institution node device determines that the authenticity audit on the cross-border remittance information of the target cross-border remittance order succeeds, the supervision institution may return to the domestic bank the receipt information allowing the cross-border remittance request to proceed.

After receiving the receipt information, the domestic bank may execute S412 to send to the overseas bank institution the target cross-border remittance request, causing the overseas bank institution to process the cross-border remittance request through a node device corresponding to the overseas bank institution to complete the remittance.

After receiving the cross-border remittance request, the overseas bank node device will also perform an authenticity audit on the cross-border remittance information of the target cross-border remittance order. Here, the step in which the domestic bank node device performs an authenticity audit on the cross-border remittance information of the target cross-border remittance request may refer to the above-mentioned authenticity audit process of the domestic bank institution node device, which is not elaborated herein.

When the overseas bank node device determines that the authenticity audit on the cross-border remittance information of the target cross-border remittance order succeeds, the overseas bank node device may continue to process the target cross-border remittance request to complete the cross-border remittance order initiated by the user.

Thus, the user completes the entire process flow of a cross-border remittance order for a cross-border order with the overseas merchant.

When a node device included in the blockchain performs an authenticity audit on the target cross-border remittance request, a result of executing the target cross-border remittance request by the smart contract for authenticity audit stored locally in the node device may also be searched, without the need of initiating a target transaction to the system for auditing authenticity of cross-border resource transfers, thereby improving the authenticity audit efficiency.

On the one hand, a cross-border remittance client may generate a cross-border remittance request for the target cross-border remittance order, based on cross-border remittance information included in a cross-border remittance order initiated by a user and identification information corresponding to the proof information for proofing authenticity of the cross-border remittance order, and send to a cross-border remittance acceptor the cross-border remittance request, causing the cross-border remittance acceptor to further search, based on the identification information, for the proof information that is stored in the blockchain and corresponds to the identification information, and perform, based on the proof information, an authenticity audit on the cross-border remittance information of the target cross-border remittance order, thereby avoiding human participations in an authenticity audit for cross-border remittance information of a target cross-border order and improving efficiency and accuracy of the authenticity audit.

On the other hand, after receiving a target transaction sent by a cross-border remittance auditor, a node device in a blockchain accessed by a cross-border remittance client may search, in response to the target contraction based on the target transaction, for the proof information that is stored in the blockchain and corresponds to the identification information, and perform, based on the proof information, an authenticity audit on the cross-border remittance information of the target cross-border remittance order, thereby avoiding human participations in an authenticity audit for cross-border remittance information of a target cross-border order and improving efficiency and accuracy of the authenticity audit.

This specification further provides a device for auditing authenticity of cross-border resource transfers 500, which is implemented on a cross-border resource transfer client, wherein a blockchain accessed by the cross-border resource transfer client stores proof information issued by a cross-border resource transfer receiver and used to prove authenticity of cross-border resource transfer information.

Figure 5:
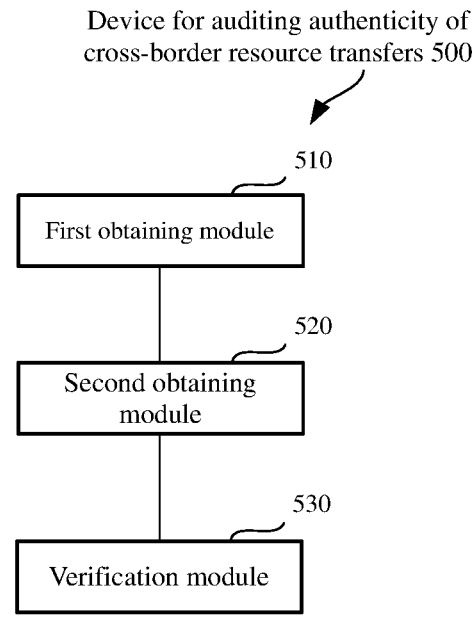
FIG. 5 is a structural diagram of a device for auditing authenticity of cross-border resource transfers according to this specification.

Refer to FIG. 5, which shows a structural diagram of a device for auditing authenticity of cross-border resource transfers according to this specification.

As shown in FIG. 5, the device 500 comprises:

a first obtaining module 510, configured to obtain the cross-border resource transfer information initiated by a cross-border resource transfer initiator;

a second obtaining module 520, configured to obtain, in response to the cross-border resource transfer information, identification information corresponding to the proof information that is stored in the blockchain and corresponds to the cross-border resource transfer information; and a verification module 530, configured to generate a cross-border resource transfer request based on the cross-border resource transfer information and the identification information, and sends to a cross-border resource transfer auditor the cross-border resource transfer request, causing the cross-border resource transfer auditor to perform an authenticity verification on the cross-border resource transfer information based on the proof information that is stored in the blockchain and corresponds to the identification information.

In an embodiment, a smart contract for managing the proof information is deployed in the blockchain; and the second obtaining module 520 is configured to:

call, in response to the cross-border resource transfer information, a generation logic in the smart contract, and generate the identification information corresponding to the proof information that is stored in the blockchain and corresponds to the cross-border resource transfer information; and obtain the identification information generated by the smart contract.

In an embodiment, the second obtaining module 520 comprises:

an obtaining sub-module, configured to obtain the identification information sent by a cross-border resource transfer receiver and corresponding to the proof information that is stored in the blockchain and corresponds to the cross-border resource transfer information.

In an embodiment, the identification information is a search index for the proof information that is stored in the blockchain and corresponds to the cross-border resource transfer information; and the verification module 530 is configured to:

search, based on the identification information, for the proof information corresponding to the identification information; and perform the authenticity verification on the cross-border resource transfer information according to the proof information.

In an embodiment, the identification information is a credible certificate generated based on the proof information that is stored in the blockchain and corresponds to the cross-border resource transfer information; and the verification module 530 is configured to:

determine whether the credible certificate is generated based on the proof information that is stored in the blockchain and corresponds to the cross-border resource transfer information, and obtaining a result of the determination; and perform, based on the result of the determination, an authenticity verification on the cross-border resource transfer information.

In an embodiment, the proof information comprises cross-border resource transfer order data issued by a cross-border resource transfer receiver.

In an embodiment, the cross-border resource transfer auditor comprises:

a cross-border resource transfer acceptor; or a cross-border resource transfer supervisor communicating with the cross-border resource transferrer.

This specification further provides a device 600 for auditing authenticity of a cross-border resource transfer, which is implemented on a node device in a blockchain accessed by a cross-border resource transfer client, wherein the blockchain stores proof information issued by a cross-border resource transfer receiver and used to prove authenticity of cross-border resource transfer information.

Figure 6:
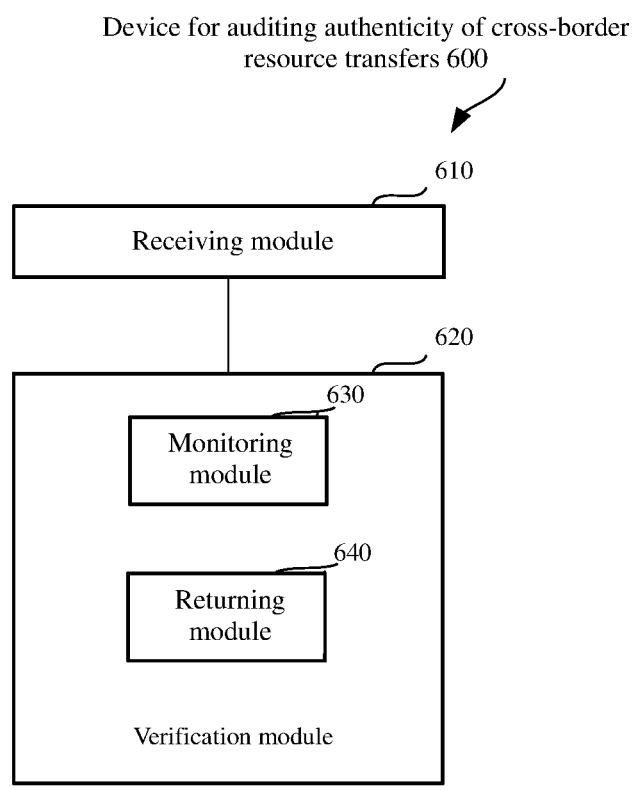
FIG. 6 is a structural diagram of a device for auditing authenticity of cross-border resource transfers according to this specification.

Refer to FIG. 6, which shows a structural diagram of a device for auditing authenticity of cross-border resource transfers according to this specification.

As shown in FIG. 6, the device 600 comprises:

a receiving module 610, configured to receive a target transaction sent by a cross-border resource transfer auditor, wherein the target transaction comprises the cross-border resource transfer information and the identification information corresponding to the proof information stored in the blockchain; and a verification module 620, configured to perform, in response to the target transaction based on the proof information corresponding to the identification information, an authenticity verification on the cross-border resource transfer information, and return to the cross-border resource transfer auditor a result of the authenticity verification.

In an embodiment, a smart contract for performing an authenticity verification on the cross-border resource transfer information is deployed in the blockchain, and the identification information is a search index for the proof information that is stored in the blockchain and corresponds to the cross-border resource transfer information; and the verification module 620 is configured to:

call a search logic in the smart contract in response to the target transaction, and search, based on the identification information, to obtain the proof information that is stored in the blockchain and corresponds to the identification information; and further call a verification logic in the smart contract for audit after the proof information that is stored in the blockchain and corresponds to the identification information is found, and verify whether cross-border resource transfer information included in the target transaction matches cross-border resource transfer information indicated by the searched proof information; if so, determine that the authenticity verification on the cross-border resource transfer information succeeds; otherwise, determine that the authenticity verification on the cross-border resource transfer information fails.

In an embodiment, a smart contract for performing an authenticity verification on the cross-border resource transfer information is deployed in the blockchain; the identification information is a credible certificate generated based on the proof information that is stored in the blockchain and corresponds to the cross-border resource transfer information; and the verification module 620 is configured to:

call a certificate check logic in the smart contract, and verify whether the credible certificate is generated based on the proof information that is stored in the blockchain and corresponds to the cross-border resource transfer information in response to the target transaction; if so, determine that the authenticity verification on the cross-border resource transfer information succeeds; otherwise, determine that the authenticity verification on the cross-border resource transfer information fails.

In an embodiment, the verification module 620 further comprises:

a monitoring module 630, configured to monitor a result of the authenticity verification performed by the smart contract on the cross-border resource transfer information; and a returning module 640, configured to return to the cross-border resource transfer auditor the result of the authenticity verification.

In an embodiment, the cross-border resource transfer auditor comprises:

a cross-border resource transfer acceptor; or a cross-border resource transfer supervisor communicating with the cross-border resource transferrer.

Figure 7:
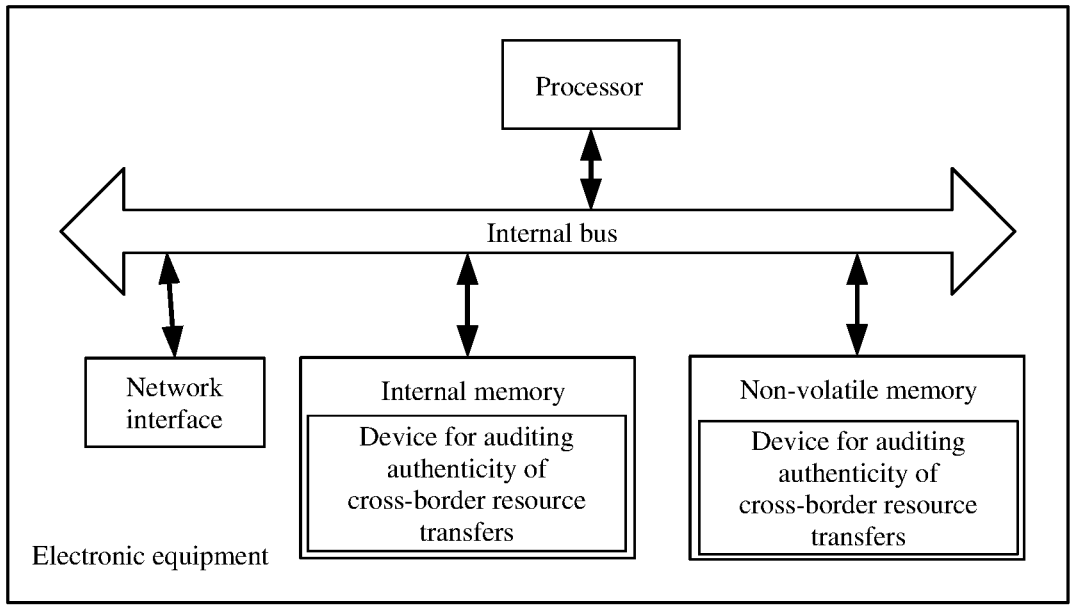
FIG. 7 is a hardware structural diagram of a device for auditing authenticity of cross-border resource transfers according to this specification.

The embodiments of a device for auditing authenticity of cross-border resource transfers according to this specification may be implemented on a device for auditing authenticity of cross-border resource transfers. The embodiments of the device may be implemented through software, hardware, or a combination of software and hardware. Take implementation through software as an example, a logical device is formed by reading, by a processor of electronic equipment where the device is located, corresponding computer program instructions in a non-volatile memory into a memory. From a hardware level, as shown in FIG. 7, a hardware structural diagram of a device for auditing authenticity of cross-border resource transfers according to this specification is illustrated. In addition to a processor, a memory, a network interface, and a non-volatile memory shown in FIG. 7, electronic equipment where the device according to the embodiments is located may also include other hardware, generally depending on the actual functions of the electronic equipment, which is not elaborated herein.

Please refer to FIG. 7, which shows a device for auditing authenticity of cross-border resource transfers, wherein the device is equipped with a cross-border resource transfer client, and a blockchain accessed by the cross-border resource transfer client stores proof information issued by a cross-border resource transfer receiver and used to prove authenticity of cross-border resource transfer information. The equipment comprises: a processor;

a memory used to store processor-executable instructions, wherein the processor is configured to call the executable instructions stored in the memory and implement the cross-border resource transfer method as shown in any one of the above-described embodiments.

Figure 8:
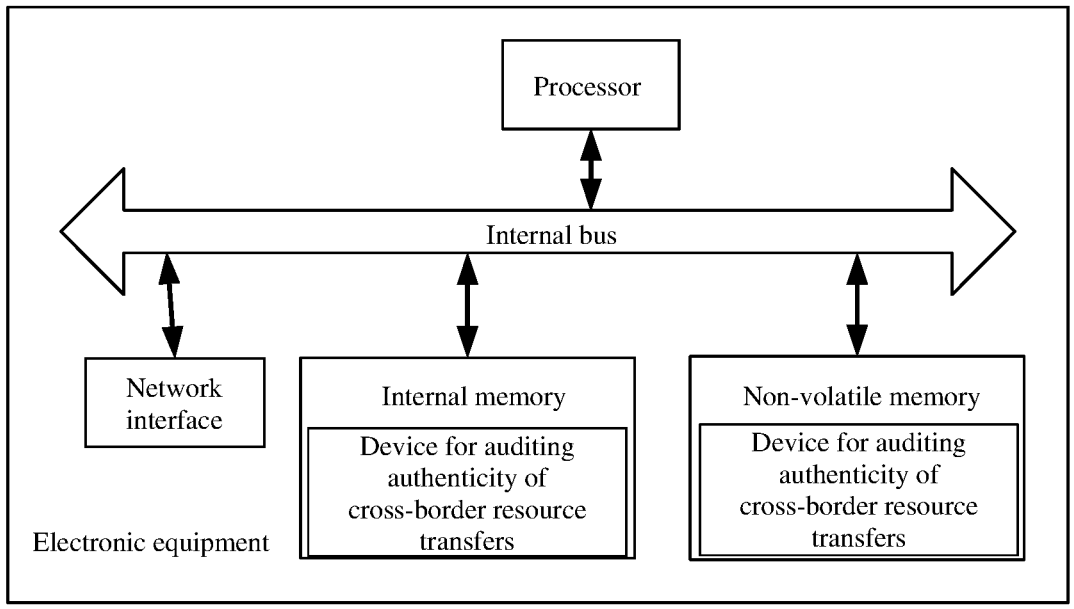
FIG. 8 is a hardware structural diagram of a device for auditing authenticity of cross-border resource transfers according to this specification.

The embodiments of a device for auditing authenticity of cross-border resource transfers according to this specification may be implemented on a device for auditing authenticity of cross-border resource transfers. The embodiments of the device may be implemented through software, hardware or a combination of software and hardware. Take implementation through software as an example, a logical device is formed by reading, by a processor of electronic equipment where the device is located, corresponding computer program instructions in a non-volatile memory into a memory. From a hardware level, as shown in FIG. 8, a hardware structural diagram of a device for auditing authenticity of cross-border resource transfers according to this specification is illustrated. In addition to a processor, a memory, a network interface, and a non-volatile memory shown in FIG. 8, electronic equipment where the device according to the embodiments is located may also include other hardware, generally depending on the actual functions of the electronic equipment, which is not elaborated herein.

Please refer to FIG. 8, which shows a device for auditing authenticity of cross-border resource transfers, wherein a blockchain accessed by the device stores proof information issued by a cross-border resource transfer receiver and used to prove authenticity of cross-border resource transfer information. The equipment comprises: a processor; and a memory used to store processor-executable instructions, wherein the processor is configured to call the executable instructions stored in the memory and implement the cross-border resource transfer method as shown in any one of the above-described embodiments.

This specification is not limited to the precise structure described above and shown in the accompanying drawings, and various modifications and changes may be made without departing from the scope thereof. The scope of this specification is only limited by the claims thereof.

Only some embodiments of this specification are described above, which do not limit this specification. Any modification, equivalent replacement, improvement and the like made within the spirit and principles of this specification shall fall within the protection scope of this specification.

What is claimed is:

1. A method for auditing authenticity of a cross-border transaction requiring a cross-border resource transfer from a domestic payer to a cross-border payee, wherein the auditing uses a blockchain having node computing devices comprising at least a client computing device associated with a payment processing service provider for processing a payment associated with the cross-border transaction, and a payee computing device, the method being implemented on the client computing device and the payee computing device, comprising:

obtaining, by the client computing device, through a first off-chain process, cross-border resource transfer information initiated by the payer, wherein the payer comprises an initiator of the cross-border resource transfer who is required to pay for the cross-border transaction, the cross-border transaction is initiated by the payer to the payee via an electronic transaction order transmitted from the payer to the payee, the payee comprises a receiver of the electronic transaction order through a second off-chain process, wherein the first off-chain process is initiated separately by the payer from the second off-chain process for the same cross-border transaction, wherein the first off-chain process and the second off-chain process are processed outside of the blockchain, and wherein the second off-chain process is followed by on-chain processing of the electronic transaction order, comprising:

receiving, by the payee computing device, the electronic transaction order from the payer;

generating, by the payee computing device, order data associated with the electronic transaction order including identification information associated with the payer;

transmitting, by the payee computing device, a ledger transaction based on the order data to the blockchain and receive a consensus from all nodes of the blockchain;

issuing, by the payee computing device, the order data to the blockchain for storage;

calling, by the payee computing device, a first smart contract for generating identification information corresponding to the order data based on a logical algorithm of the first smart contract; and storing, on the blockchain, the identification information for auditing authenticity of cross-border transactions;

obtaining, by the client computing device, in response to the cross-border resource transfer information and using a second smart contract, the identification information corresponding to the order data from the blockchain, wherein the identification information is generated and stored by the blockchain, and the identification information comprises information uniquely identifying the payment associated with the cross-border transaction;

generating, by the client computing device, a cross-border resource transfer request based on the cross-border resource transfer information and the identification information;

sending, by the client computing device, to an auditor of cross-border resource transfers, the cross-border resource transfer request, wherein the auditor comprises a supervision institution independent from a domestic bank associated with the payer, and the cross-border resource transfer request causes an auditor node computing device in the blockchain and accessed by the auditor to perform, based on proof information that is stored in the blockchain and corresponds to the identification information, an authenticity verification using a third smart contract on the cross-border resource transfer information by, determining whether cross-border resource transfer information received from the auditor matches cross-border resource transfer information indicated by the proof information, when the identification information comprises a search index for the proof information, and determining whether a credible certificate received from the auditor is a credible certificate generated based on the proof information, when the identification information comprises a credible certificate, wherein the proof information is provided and uploaded to the blockchain by the receiver of the cross-border resource transfer, and comprises at least proof documents proving a resource transfer relationship between the initiator of the cross-border resource transfer and the receiver of the cross-border resource transfer;

sending, by a domestic bank node computing device of the domestic bank, a remittance request to an overseas bank node computing device of an overseas bank, wherein the overseas bank is associated with the payee;

performing, by the overseas bank node computing device, an authenticity audit based on the authenticity verification performed by the auditor; and process, by the overseas bank and the domestic bank, the remittance request to complete the payment associated with the cross-border transaction.

2. The method of claim 1, wherein
the second smart contract is deployed in the blockchain, and
the obtaining, by the client computing device, in response to the cross-border resource transfer information and using the second smart contract, the identification information comprises:
calling, in response to the cross-border resource transfer information, a generation logic in the second smart contract to generate the identification information corresponding to the proof information that is stored in the blockchain and corresponds to the cross-border resource transfer information; and
obtaining the identification information generated by the second smart contract.

3. The method of claim 1, wherein
the determining whether cross-border resource transfer information received from the auditor matches cross-border resource transfer information indicated by the proof information comprises:
searching the blockchain, based on the search index, for the proof information corresponding to the identification information;
obtaining the cross-border resource transfer information indicated by the proof information;
determining whether the cross-border resource transfer information received from the auditor matches the cross-border resource transfer information indicated by the proof information, and obtaining a result of the determination; and
returning, based on the result of the determination, a result of the authenticity verification.

4. The method of claim 1, wherein
the determining whether a credible certificate received from the auditor is a credible certificate is generated based on the proof information comprises:
generating the credible certificate based on the proof information that is stored in the blockchain and corresponds to the cross-border resource transfer information;
determining whether the credible certificate received from the auditor is the credible certificate generated based on the proof information, and obtaining a result of the determination; and
returning, based on the result of the determination, a result of the authenticity verification.

5. The method of claim 1, wherein the proof information comprises cross-border resource transfer order data issued by the receiver of the cross-border resource transfer.

6. The method of claim 1, wherein the auditor of cross-border resource transfers comprises:
an acceptor of cross-border resource transfers.

7. A method for auditing authenticity of a cross-border transaction requiring a cross-border resource transfer from a domestic payer to a cross-border payee, wherein the auditing authenticity uses a blockchain having node computing devices comprising at least an auditor node computing device accessed by an auditor of a payment associated with the cross-border transaction, and a payee computing device, the method being implemented on the auditor node computing device and the payee computing device, comprising:
obtaining, by the auditor node computing device, a cross-border resource transfer request, wherein the auditor comprises a supervision institution independent from a domestic bank associated with the payer, wherein the cross-border resource transfer request is generated based on cross-border resource transfer information and identification information, the cross-border resource transfer information is initiated by the payer through a first off-chain process, the payer comprises an initiator of the cross-border resource transfer, who is required to pay for the cross-border transaction, the cross-border transaction is initiated by the payer to the payee via an electronic transaction order transmitted from the payer to the payee, the payee comprises a receiver of the electronic transaction order through a second off-chain process, the first off-chain process is initiated separately by the payer from the second off-chain process for the same cross-border transaction, the first off-chain process and the second off-chain process are processed outside of the blockchain, and the second off-chain process is followed by on-chain processing of the electronic transaction order, wherein the auditor node computing device is accessed by the auditor, and wherein the cross-border resource transfer information is obtained by:
receiving, by the payee computing device, the electronic transaction order from the payer;
generating, by the payee computing device, order data associated with the electronic transaction order including identification information associated with the payer;
transmitting, by the payee computing device, a ledger transaction based on the order data to the blockchain and receive a consensus from all nodes of the blockchain;
issuing, by the payee computing device, the order data to the blockchain for storage;
calling, by the payee computing device, a first smart contract for generating identification information corresponding to the order data based on a logical algorithm of the first smart contract;
storing, on the blockchain, the identification information for auditing authenticity of cross-border transactions; and
obtaining, by a client computing device, in response to the cross-border resource transfer information and using a second smart contract, the identification information corresponding to the order data from the blockchain, wherein the identification information comprises information uniquely identifying the payment associated with the cross-border transaction; and
performing, by the auditor node computing device, in response to the cross-border resource transfer request and based on proof information that is stored in the blockchain and corresponds to the identification information, an authenticity verification using a third smart contract on the cross-border resource transfer information, by
determining whether cross-border resource transfer information received from the auditor matches cross-border resource transfer information indicated by the proof information, when the identification information comprises a search index for the proof information, and
determining whether a credible certificate received from the auditor is a credible certificate generated based on the proof information, when the identification information comprises a credible certificate,
wherein the proof information is provided and uploaded to the blockchain by the receiver of the cross-border resource transfer, and comprises at least proof documents proving a resource transfer relationship between the initiator of the cross-border resource transfer and the receiver of the cross-border resource transfer; and
returning to the auditor a result of the authenticity verification.

8. The method of claim 7, wherein
the third smart contract is deployed in the blockchain; and
the determining whether cross-border resource transfer information received from the auditor matches cross-border resource transfer information indicated by the proof information comprises:
calling, in response to the cross-border resource transfer request, a search logic in the third smart contract to search the blockchain, based on the identification information, to obtain the proof information corresponding to the identification information; and
further calling a verification logic in the third smart contract, after the proof information is found, to verify whether the cross-border resource transfer information matches the cross-border resource transfer information indicated by the proof information:
if the cross-border resource transfer information matches the cross-border resource transfer information indicated by the proof information, determining that the authenticity verification on the cross-border resource transfer information succeeds; and
if the cross-border resource transfer information does not match the cross-border resource transfer information indicated by the proof information, determining that the authenticity verification on the cross-border resource transfer information fails.

9. The method of claim 7, wherein
the third smart contract is deployed in the blockchain; and
the determining whether a credible certificate received from the auditor is a credible certificate is generated based on the proof information comprises:
generating the credible certificate based on the proof information that is stored in the blockchain and corresponds to the cross-border resource transfer information;
calling, in response to the cross-border resource transfer request, a certificate check logic in the third smart contract to verify whether the credible certificate received from the auditor is the credible certificate generated based on the proof information:
if the credible certificate is verified to be generated based on the proof information, determining that the authenticity verification on the cross-border resource transfer information succeeds; and
if the credible certificate is not verified to be generated based on the proof information, determining that the authenticity verification on the cross-border resource transfer information fails.

10. The method of claim 7, wherein the returning to the auditor a result of the authenticity verification comprises:
monitoring the result of the authenticity verification performed by a fourth smart contract on the cross-border resource transfer information; and
returning to the auditor the result of the authenticity verification.

11. The method of claim 7, wherein the auditor comprises:
an acceptor of cross-border resource transfers; or
a supervisor of cross-border resource transfers communicating with a cross-border resource transferrer.

12. A system for auditing authenticity of a cross-border transaction requiring a cross-border resource transfer from a domestic payer to a cross-border payee, wherein the auditing authenticity uses a blockchain having node computing devices comprising at least a client computing device associated with a payment processing service provider for processing a payment associated with the cross-border transaction, and a payee computing device, comprising a processor and a non-transitory computer-readable storage medium storing instructions executable by the processor to cause the system to perform operations comprising:
obtaining, through a first off-chain process, cross-border resource transfer information initiated by the payer, wherein the payer comprises an initiator of the cross-border resource transfer, who is required to pay for the cross-border transaction, the cross-border transaction is initiated by the payer to the payee via an electronic transaction order transmitted from the payer to the payee, the payee comprises a receiver of the electronic transaction order through a second off-chain process, wherein the first off-chain process is initiated separately by the payer from the second off-chain process for the same cross-border transaction, wherein the first off-chain process and the second off-chain process are processed outside of the blockchain, and wherein the second off-chain process is followed by on-chain processing of the electronic transaction order, comprising:
receiving the electronic transaction order from the payer;
generating order data associated with the electronic transaction order including identification information associated with the payer;
transmitting a ledger transaction based on the order data to the blockchain and receive a consensus from all nodes of the blockchain;
issuing the order data to the blockchain for storage;
calling a first smart contract for generating identification information corresponding to the order data based on a logical algorithm of the first smart contract; and
storing, on the blockchain, the identification information for auditing authenticity of cross-border transactions;
obtaining, in response to the cross-border resource transfer information and using a second smart contract, the identification information corresponding to the order data from the blockchain, wherein the identification information is generated and stored by the blockchain, and the identification information comprises information uniquely identifying the payment associated with the cross-border transaction;
generating a cross-border resource transfer request based on the cross-border resource transfer information and the identification information;
sending, to an auditor of cross-border resource transfers, the cross-border resource transfer request, wherein the auditor comprises a supervision institution independent from a domestic bank associated with the payer, and the cross-border resource transfer request causes an auditor node computing device in the blockchain and accessed by the auditor to perform, based on proof information that is stored in the blockchain and corresponds to the identification information, an authenticity verification using a third smart contract on the cross-border resource transfer information by,
determining whether cross-border resource transfer information received from the auditor matches cross-border resource transfer information indicated by the proof information, when the identification information comprises a search index for the proof information, and
determining whether a credible certificate received from the auditor is a credible certificate generated based on the proof information, when the identification information comprises a credible certificate,
wherein the proof information is provided and uploaded to the blockchain by the receiver of the cross-border resource transfer, and comprises at least proof documents proving a resource transfer relationship between the initiator of the cross-border resource transfer and the receiver of the cross-border resource transfer;
sending, by a domestic bank node computing device of the domestic bank, a remittance request to an overseas bank node computing device of an overseas bank, wherein the overseas bank is associated with the payee;
performing, by the overseas bank node computing device, an authenticity audit based on the authenticity verification performed by the auditor; and
process, by the overseas bank and the domestic bank, the remittance request to complete the payment associated with the cross-border transaction.

13. The system of claim 12, wherein
the second smart contract is deployed in the blockchain, and
the obtaining, in response to the cross-border resource transfer information and using the second smart contract, the identification information comprises:
calling, in response to the cross-border resource transfer information, a generation logic in the second smart contract to generate the identification information corresponding to the proof information that is stored in the blockchain and corresponds to the cross-border resource transfer information; and
obtaining the identification information generated by the second smart contract.

14. The system of claim 12, wherein the obtaining identification information comprises:
obtaining the identification information from the receiver of the cross-border resource transfer.

15. The system of claim 12, wherein
the determining whether cross-border resource transfer information received from the auditor matches cross-border resource transfer information indicated by the proof information comprises:
searching the blockchain, based on the search index, for the proof information corresponding to the identification information;
obtaining the cross-border resource transfer information indicated by the proof information;
determining whether the cross-border resource transfer information received from the auditor matches the cross-border resource transfer information indicated by the proof information, and obtaining a result of the determination; and
returning, based on the result of the determination, a result of the authenticity verification.

16. The system of claim 12, wherein
the determining whether a credible certificate received from the auditor is a credible certificate is generated based on the proof information comprises:
  generating the credible certificate based on the proof information that is stored in the blockchain and corresponds to the cross-border resource transfer information;
  determining whether the credible certificate received from the auditor is the credible certificate generated based on the proof information, and obtaining a result of the determination; and
  returning, based on the result of the determination, a result of the authenticity verification.

17. The system of claim 12, wherein the proof information comprises cross-border resource transfer order data issued by the receiver of the cross-border resource transfer.

18. The system of claim 12, wherein the auditor of cross-border resource transfers comprises:
  an acceptor of cross-border resource transfers.

* * * * *